(12) United States Patent
Keskitalo et al.

(10) Patent No.: US 10,462,691 B2
(45) Date of Patent: Oct. 29, 2019

(54) PLMN RESTRICTION FOR MBSFN MEASUREMENT REPORTING

(71) Applicant: Nokia Technologies Oy, Espoo (FI)

(72) Inventors: Ilkka Antero Keskitalo, Oulu (FI); Jarkko Tuomo Koskela, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 125 days.

(21) Appl. No.: 15/307,493

(22) PCT Filed: May 9, 2014

(86) PCT No.: PCT/US2014/037585
§ 371 (c)(1),
(2) Date: Oct. 28, 2016

(87) PCT Pub. No.: WO2015/171165
PCT Pub. Date: Nov. 12, 2015

(65) Prior Publication Data
US 2017/0055171 A1 Feb. 23, 2017

(51) Int. Cl.
*H04W 24/10* (2009.01)
*H04W 4/06* (2009.01)
(Continued)

(52) U.S. Cl.
CPC ............ *H04W 24/10* (2013.01); *H04W 4/06* (2013.01); *H04W 48/16* (2013.01); *H04L 12/189* (2013.01)

(58) Field of Classification Search
CPC ... H04W 24/10; H04W 84/042; H04W 24/08; H04W 36/0083; H04W 48/16; H04W 4/06; H04L 12/189
See application file for complete search history.

(56) References Cited

U.S. PATENT DOCUMENTS 9,253,671 B2 * 2/2016 Jung ............... H04W 24/08
9,253,678 B2 * 2/2016 Keskitalo ......... H04W 24/10
(Continued)

FOREIGN PATENT DOCUMENTS

WO 2011157292 12/2011

OTHER PUBLICATIONS

International Search Report and Written Opinion received for corresponding Patent Cooperation Treaty Application No. PCT/US2014/037585, dated Nov. 10, 2014, 10 pages.
(Continued)

*Primary Examiner* — Will W Lin
(74) *Attorney, Agent, or Firm* — Mintz Levin Cohn Ferris Glovsky and Popeo, P.C.

(57) ABSTRACT

Methods and apparatus, including computer program products, are provided for MBSFN measurements. In one aspect there is provided a method. The method may include logging, at a user equipment, one or more measurements performed on one or more subframes associated with multicast broadcast mobile services; and determining, by the user equipment based on a configured rule, whether a serving network node is a public land mobile network to which the user equipment is allowed to indicate availability of the logged one or more measurements and/or report the logged one or more measurements. Related apparatus, systems, methods, and articles are also described.

18 Claims, 4 Drawing Sheets

(51) Int. Cl.
*H04W 48/16* (2009.01)
*H04L 12/18* (2006.01)

(56) References Cited

U.S. PATENT DOCUMENTS

| | | | | |
|---|---|---|---|---|
| 2009/0248840 | A1* | 10/2009 | Garg | H04L 12/4625 709/220 |
| 2013/0010624 | A1* | 1/2013 | He | H04L 41/5009 370/252 |
| 2017/0064518 | A1* | 3/2017 | Kim | H04W 24/10 |
| 2017/0295054 | A1* | 10/2017 | Lee | H04W 24/10 |

OTHER PUBLICATIONS

Nsn et al: "Higher later issues with 1-3,7, MBSFN MDT measurements", 12-15, 3GPP DRAFT; R2-140378 MDT Higher Layer 19, Issues, 3rd Generation Partnership Project 24-27,(3GPP), Mobile Competence Centre ; 650, Route Des Lucioles ; F-06921, 31,36,37, Sophia-Antipolis Cedex ; France, Sophia-Antipolis Cedex ; France, vol. RAN WG2, No. Prague, Czech Republic; Feb. 10, 2014-Feb. 14, 2014, Feb. 9, 2014 (Feb. 9, 2014), XP050737590, Retrieved from the Internet: URL:https://www.3gpp.org/ftp/tsg_ran_WG2_RL2/TSGR2_85/docs/.

CATT: "Clarification of multi-PLMN 4-6, support", 8-11, 3GPP DRAFT; R2-125398, 3rd Generation 16-18, Partnership Project (3GPP), Mobile 20-23, Competence Centre ; 650, Route Des 28-30, Lucioles ; F-06921 Sophia-Antipolis Cedex 32-35, France, vol. RAN WG2, No. New Orleans, USA; Nov. 12, 2012-Nov. 16, 2012 Nov. 2, 2012 (Nov. 2, 2012), XP050667200, Retrieved from the Internet: URL: http://www.3gpp.org/ftp/tsg_ran/WG2_RL2/TSGR2 80/Docs/[retrieved on Nov. 2, 2012].

Nsn et al: "MBSFN measurements for Logged and immediate MDT",3GPP DRAFT; R2-140380 MBSFN Measurements 1-37 for Logged and Immediate MDT, 3rd Generation Partnership Project (3GPP), Mobile Competence Center ; 650, Route Des Lucioles ; F-06921 Sophia-Antipolis Cedex vol. RAN WG2, no. Prague, Czech Republic; Feb. 10, 2014-Feb. 14, 2014, Feb. 9, 2014 (Feb. 9, 2014), XP050737592, Retrieved from the Internet:URL:http://www.3gpp.org/ftp/Meetings_3GPP_SYNC/RAN/RAN2/Docs/[retrieved on https://www.3gpp.org/ftp/tsg_ran/WG2_RL2/TSGR2_85/docs/.

Nsn et al: "PLMN handling with MBSFN measurements", May 6, 2014 (May 6, 2014), XP055149268, 3GPP TSG-RAN-WG2 1-37 Retrieved from the Internet:URL:http://www.3gpp.org/ftp/tsg_ran/WG2_RL2/TSGR2 86/Docs/ [retrieved on Oct. 28, 2014].

3GPP, "Technical Specification Group Radio Access Network; Evolved Universal Terrestrial Radio Acces (E-UTRA); Multiplexing and channel coding (Release 12)," 3rd Generation Partnership Project, 3GPP TS 36.212 V12.0.0, Dec. 2013, (88 pages).

3GPP, "Technical Specification Group Radio Access Network; Evolved Universal Terrestrial Radio Access (E-UTRA); LTE physical layer; General description (Release 11)," 3rd Generation Partnership Project, 3GPP TS 36.201 V11.1.0, Dec. 2012, (13 pages).

3GPP, "Technical Specification Group Radio Access Network; Evolved Universal Terrestrial Radio Access (E-UTRA); Physical channels and modulation (Release 12)," 3rd Generation Partnership Project, 3GPP TS 36.211 V12.1.0, Mar. 2014, (120 pages).

3GPP, "Technical Specification Group Radio Access Network; Evolved Universal Terrestrial Radio Access (E-UTRA); Physical layer procedures (Release 12)," 3rd Generation Partnership Project, 3GPP TS 36.213 V12.1.0, Mar. 2014, (186 pages).

3GPP, "Technical Specification Group Radio Access Network; Evolved Universal Terrestrial Radio Access (E-UTRA); Physical layer; Measurements (Release 11)," 3rd Generation Partnership Project, 3GPP TS 36.214 V11.1.0, Dec. 2012, (14 pages).

3GPP, "Technical Specification Group Radio Access Network; Evolved Universal Terrestrial Radio Access (E-UTRA); Radio Resource Control (RRC); Protocol specification (Release 12)," 3rd Generation Partnership Project, 3GPP TS 36.331 V12.1.0, Mar. 2014, (356 pages).

ETSI, "Universal Mobile Telecommunications System (UMTS); Radio Resource Control (RRC); Protocol specification," ETSI TS 125 331, V10.15.0, Mar. 2014, (1920 pages).

* cited by examiner

PLMN RESTRICTION FOR MBSFN MEASUREMENT REPORTING

RELATED APPLICATION

This application was originally filed as PCT Application No. PCT/US2014/037585 filed May 9, 2014.

FIELD

The subject matter described herein relates to wireless communications.

BACKGROUND

Multimedia Broadcast Multicast Services (MBMS) relates to multicasting services broadcast by one or more cellular base stations. For example, a cellular network may provide a service, such as mobile television application as well as any other application, to one or more user equipment using for example a multicast broadcast single-frequency network (MBSFN) in which base stations transmit on the same frequency in a coordinated way to provide for example the mobile television broadcast as well as any other application.

SUMMARY

Methods and apparatus, including computer program products, are provided for multicast broadcast single-frequency network measurements and reporting.

In some example embodiments, there may be provided method. The method may include logging, at a user equipment, one or more measurements performed on one or more subframes associated with multicast broadcast mobile services; and determining, by the user equipment based on a configured rule, whether a serving network node is a public land mobile network to which the user equipment is allowed to indicate availability of the logged one or more measurements and/or report the logged one or more measurements.

In some variations, one or more of the features disclosed herein including the following features can optionally be included in any feasible combination. The configured rule may allow the indication and/or the report to only networks listed on a public land mobile network identity list received as part of a measurement configuration of the user equipment. The configured rule may allow the indication and/or the report to networks listed on a public land mobile network identity list received as part of a measurement configuration of the user equipment, registered public land mobile network networks when the measurement configuration is received at the user equipment, and/or public land mobile network networks identified from one or more temporary mobile group identities received in a multicast broadcast single-frequency network coverage area, wherein the one or more temporary mobile group identities each include public land mobile network identity information. A combination of networks listed on the public land mobile network identity list received as part of a measurement configuration of the user equipment and the public land mobile network networks identified in the temporary mobile group identities received in a multicast broadcast single-frequency network coverage area may be used as the allowed public land mobile networks. Common public land mobile network identifiers of the networks listed on the public land mobile network identity list received as part of a measurement configuration of the user equipment and the public land mobile network networks identified in the temporary mobile group identities received in a multicast broadcast single-frequency network coverage area may be used as the allowed public land mobile networks along with the registered public land mobile network. The configured rule may allow the indication and/or the report only to networks identified from one or more temporary mobile group identities received in a multicast broadcast single-frequency network coverage area, wherein the one or more temporary mobile group identities each include public land mobile network identity information. The configured rule may allow the indication and/or the report to networks listed on a public land mobile network identity list received as part of a measurement configuration of the user equipment and/or public land mobile network networks identified from one or more temporary mobile group identities received in a multicast broadcast single-frequency network coverage area, wherein the one or more temporary mobile group identities each include public land mobile network identity information. A combination of the networks listed on the public land mobile network identity list received as part of a measurement configuration of the user equipment and the public land mobile network networks identified in the temporary mobile group identities received in a multicast broadcast single-frequency network coverage area may be used as the allowed public land mobile networks. Common public land mobile network identifiers of the networks listed the a public land mobile network identity list received as part of a measurement configuration of the user equipment and the public land mobile network networks identifiers in the temporary mobile group identities received in a multicast broadcast single-frequency network coverage area may be used as the allowed public land mobile networks. The allowed public land mobile networks may consist of all public land mobile networks included in the temporary mobile group identities. The allowed public land mobile networks may include the public land mobile networks of the temporary mobile group identities that the user equipment is receiving. The configured rule may allow the indication and/or the report to only registered public land mobile network networks when the measurement configuration is received at the user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings.

Like labels are used to refer to same or similar items in the drawings.

DETAILED DESCRIPTION

In Multimedia Broadcast Multicast Services (MBMS), one or more user equipment may be configured to perform measurements of the multicast broadcast single-frequency network (MBSFN), and report those measurements to a network. The types of measurements, reporting, and/or other aspects may be configured by the network and/or specified by a standard. For example, a user equipment may perform MBSFN measurements associated with a certain geographical area covered by the MBMS. Moreover, the MBSFN measurements may support verification of MBSFN signal reception, support planning and reconfiguration (for example, of MBSFN areas and/or MBMS operational parameters), and/or support MBSFN radio reception measurement(s) to be collected utilizing, for example, a Minimization of Drive Test (MDT) functionality.

The MBSFN measurements performed by a user equipment may include reference signal received power (RSRP) and/or reference signal received quality (RSRQ) determinations per a given MBSFN coverage area. Furthermore, these measurements may be based on a received signal strength indicator (RSSI) measurements averaged over for example only those orthogonal frequency division multiplexing (OFDM) symbols in subframes carrying MBSFN reference signals (RS), although the RSRP and RSRQ may be determined in other ways as well. In addition, the measurements may include a multicast channel (MCH) block error rate (BLER) measurement per MBSFN MCS (modulation and coding scheme) and/or per MBSFN area. Moreover, these measurements may be performed only in for example subframes and carriers where the user equipment is decoding a physical multicast channel (PMCH), although other types of measurements may be performed as well.

Furthermore, the network may provide an MBSFN measurement configuration (which may also including a reporting configuration), and this configuration may be provided by a MDT (Minimization of Drive Tests) functionality as well as via other mechanisms as well. In the case of MDT, MBSFN measurements may be initiated by the operation, administration and maintenance (OAM) functionality of a network, where a Trace function activates the MBSFN measurements and collects reported data. When a user equipment is configured with the MBSFN measurements, the user equipment may also perform MBSFN measurements according to certain given performance requirements, examples of which are described in 3GPP TS 36.133, Evolved Universal Terrestrial Radio Access (E-UTRA); Requirements for support of radio resource management, Release 12. Furthermore, the user equipment may be configured to perform MBSFN measurements during MBMS service reception and, in particular, during, for example, a radio resource control (RRC) connected mode and/or idle mode. Examples of MBSFN measurement definitions can be found in 3GPP TS 36.214, while examples of radio resource management configuration and reporting may be found in 3GPP TS 36.331. Moreover, MDT configuration and reporting may be in accordance with for example 3GPP TS 36.331, 25.331, as well as other specifications.

MBSFN measurements may, as noted, enable the network to obtain measurement feedback from user equipment, and this feedback may provide an indication of the quality of the MBMS services that are multicast or broadcast. The network may use the feedback measurements for providing among other things improved user experience and/or improved MBMS services. For example, MBSFN measurements, such as RSRP, RSRQ, BLER measurement, and/or other measurements, may be performed by the user equipment per MBSFN area for a given time, and the MBSFN measurements may be reported per MBSFN area. If the user equipment cannot report the MBSFN measurements, these measurements may be logged. When this is the case, the user equipment may subsequently signal the network that logged MBSFN measurements are available. The user equipment may then provide the measurements, when requested by the network.

In the case of MDT, MDT functionality may manage the user equipment's measurement configuration as well as MBSFN measurement, measurement logging, and reporting. Moreover, the user equipment may perform the configured measurements while actively receiving MBMS service(s) on the configured MBSFN area. And, MBSFN measurement results may be logged by the user equipment while decoding the PMCH corresponding to the MBSFN area. The user equipment may then signal the network that an MBSFN measurement log exists at the user equipment, and that this MBSFN log of measurements can be retrieved by the network when requested by the network. But in the case of MDT, the measurement configuration may include a PLMN identity list to which the availability of the MDT logged measurements can be indicated and/or reported. In addition to this PLMN identity list, the registered (or attached) PLMN (RPLMN) at the time of MDT configuration may be included in the allowed PLMN list. In the case of MBSFN, a single MBSFN area may be used to broadcast and/or multicast multiple services, each of which may have a unique service identifier (ID). This service ID may be included in the temporary mobile group identity (TMGI), which may consist of a service ID and a PLMN ID (which may further include the mobile country code (MCC) and mobile network code (MNC)). Although some standards may allow a single MBSFN area to carry services from multiple PLMNs, this may cause an ambiguity with respect to whether all of (or which of) the PLMNs in the MBSFN area should be included in the allowed PLMN list indicative of those networks allowed to receive MBSFN logged measurement results (or an indication of their availability).

In some example embodiments, the subject matter disclosed herein may identify which PLMNs should receive an indication of the availability of logged MBSFN measurements and/or receive the logged MBSFN measurements (for example, when requested by the network).

In some example embodiments, a user equipment that intends/seeks to receive MBMS service may decode one or more TMGIs of one or more corresponding MBMS services of interest. For an MBSFN measurement configuration, the network may send a logged measurement configuration including a PLMN identity list. The user equipment receiving a measurement configuration may, in some example embodiments, be configured to use the received PLMN identity list for purposes of reporting the indication of logged MBSFN measurements available at the user equipment and/or reporting the logged measurements to the network. The user equipment may use the received PLMN identity list in a variety of ways to determine which PLMNs should be allowed to receive the indication of available logged MBSFN measurements and/or receive the logged MBSFN measurements as described further below at configured rules 1-5.

CONFIGURED RULE 1: A user equipment may, in some example embodiments, receive measurement configuration information including logged MBSFN measurement configuration information (which as noted above may be received as part of MDT). Moreover, the network may be required, in some example embodiments, to include the PLMN identity list in the logged measurement configuration sent to the user equipment. While in the MBSFN coverage area, the user equipment may indicate the availability of logged MBSFN measurements and/or report the logged MBSFN measurements only to the network(s) listed in the PLMN identity list, and, as such, eliminate the above-noted ambiguity. As used herein, the PLMN identity list may include at least one identifier to uniquely identify a network, and each of the PLMNs may include a mobile country code (MCC) and mobile network code (MNC).

CONFIGURED RULE 2: In some example embodiments, the allowed PLMN(s) for an MBSFN coverage area may include the (1) PLMN identity list (which may be received as part of the logged measurement configuration information), (2) the RPLMN defined at the time of MBSFN measurement configuration, and (3) the PLMN(s) in the TMGI(s) for the MBSFN area. For example, the allowed networks to which the user equipment may indicate the availability of logged MBSFN measurements and/or report the logged MBSFN measurements may include all of the networks listed in (1)-(3). The allowed PLMNs may, in addition to RPLMN, consist of both the PLMNs in the logged MDT configuration and PLMNs from the TMGI(s) of the MBSFN area. Alternatively or additionally, the allowed PLMNs may, in addition to RPLMN, consist of PLMNs common to both PLMN identity list and PLMN(s) from the TMGI(s) of the MBSFN area.

CONFIGURED RULE 3: In some example embodiments, only the TMGI(s) in the MBSFN area configuration may be used as the allowed PLMNs. The TMGI refers to a unique identifier for a service provided by the MBSFN. In a given MBSFN area, there may be one or more services provided by the MBSFN. As such, each of the services (which are multicast or broadcast by the network to the user equipment) may be identified by a TMGI, and, it thus follows that each service has a corresponding service identifier and a PLMN identifier. When this is the case, only the TMGIs and thus the PLMN(s) identified by the TMGI(s) in the service(s) actually being received or decoded by the user equipment may be used, in accordance with same example embodiments, as the allowed networks/PLMNs for reporting the availability of logged MBSFN measurements and/or reporting the logged MBSFN measurements. Alternatively or additionally, all of the PLMNs (which are included in the TMGIs) in the MBSFN area may, in some example embodiments, be used as allowed networks/PLMNs for reporting the indication of the availability of logged MBSFN measurements and/or reporting the logged MBSFN measurements. In this latter case in which all PLMNs in the MBSFN area are treated as allowed PLMNs, the user equipment may be required to decode and store all of the PLMN IDs of all of the TMGIs sent in the MBSFN area regardless of the quantity of services the user equipment intended to receive.

CONFIGURED RULE 4: In some example embodiments, the PLMN identity list (which may be received as part of the logged measurement configuration information) and the PLMN(s) (which are obtained as part of the TMGIs in the MBSFN area configuration information) may be used as the allowed networks/PLMN for purposes of reporting the indication of the availability of logged MBSFN measurements and/or reporting the logged measurements. With respect to the TMGI(s), the user equipment may, as noted above with the previous embodiment at configured rule 3, use only the TMGIs and thus the PLMN(s) identified in the TMGI(s) in the service(s) actually being received by the user equipment or all of the PLMNs (which are included in the TMGIs) in the MBSFN area regardless of whether the user equipment intended to receive the underlying service(s). The allowed PLMNs may consist of both the PLMNs in the logged MDT configuration and PLMNs from the TMGI(s) of the MBSFN area. Alternatively or additionally, the allowed PLMNs may consist of PLMNs common to both PLMN identity list and PLMN(s) from the TMGI(s) of the MBSFN area.

CONFIGURED RULE 5: In some example embodiments, only the RPLMN at the time of MBSFN MDT measurement configuration at the user equipment may be used as the allowed networks/PLMNs for receiving the indication of available logged MBSFN measurements and/or reporting the logged MBSFN measurements.

In some of the above-noted embodiments in which the TMGIs and/or RPLMN are used, the PLMN identity list may (or may not) be provided by the network (so in this sense the PLMN identity list may be considered optional information).

To illustrate by way of an example, the network may configure the user equipment with logged MBMS measurement configuration information via for example a LoggedMeasurementConfiguration message. In response to the logged measurement configuration, the user equipment may then begin to make MBSFN measurements and, if the MBMS measurements cannot be reported, log the MBMS measurements for subsequent reporting to the network.

While in a given MBSFN coverage area, the user equipment may determine which networks/PLMNs are allowed to receive an indication of logged MBMS measurements and/or a report of the logged MBMS measurements. For example, the user equipment may determine whether a cell or base station serving the user equipment are on the list of allowed networks/PLMNs as determined via one of the configuration rules 1-5. The user equipment may use a given one of the configuration rules based on a configuration provide by the network and/or defined by a standard. If a network is allowed, the user equipment may signal the indication of available logged MBMS measurements in a variety of ways including via a message, such as an RCConnectionReconfigurationComplete message, an RRCConnectionReestablishmentComplete message, and/or an RRC-ConnectionSetupComplete message. In response, the allowed network may then request the user equipment to report logged measurements including the MBSFN logged measurements. The network's logged measurements request may be carried via a message, such as a UEInformationRequest message. In response, the user equipment may send the MBSFN logged measurements to the allowed network, and the logged measurements may be sent to the network via a message, such as an UEInformationResponse message including MBSFN measurement log.

Before providing additional examples related MBSFN measurements, the following provides a description of an example of a system, in accordance with some example embodiments.

Figure 1:
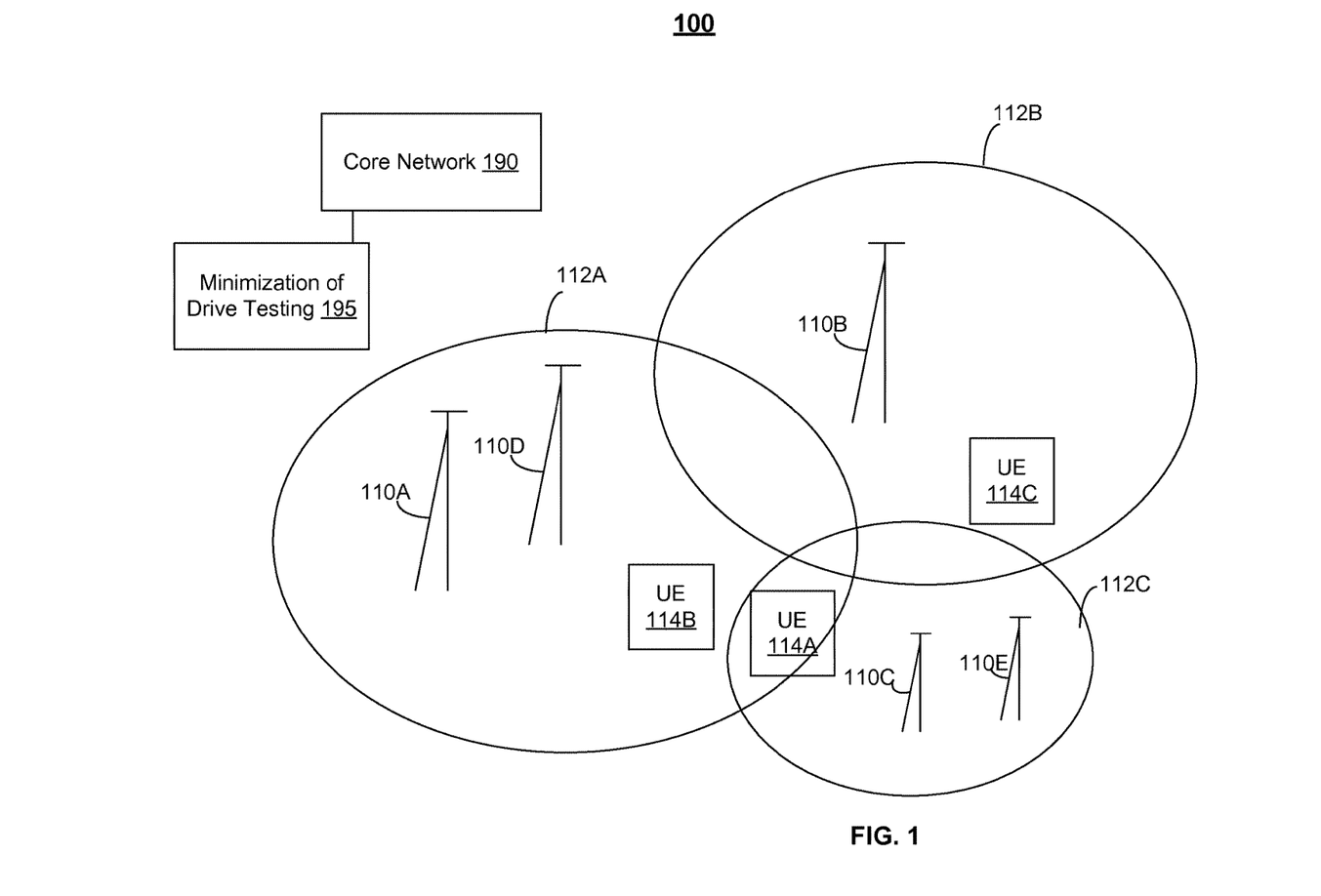
FIG. 1 depict an example of a system configured for determining one or more public land mobile networks (PLMNs) allowed to receive an indication of logged multicast broadcast single-frequency network (MBSFN) measurement availability and/or a report including the logged multicast broadcast single-frequency network (MBSFN) measurements, in accordance with some exemplary embodiments.

FIG. 1 depicts a system 100 including a core network 190 and a minimization of drive testing function/node, both of which may be coupled via one or more backhaul links/networks to a plurality of base stations, such as base stations 110A-C serving cells 112A-C, and corresponding user equipment 114A-C. The base stations may be configured to provide a MBSFN to one or more user equipment 114A-C.

Although FIG. 1 depicts a certain quantity and configuration of devices, other quantities and configurations may be implemented as well. For example, other quantities and configurations of base stations/access points, cells, and user equipment may be implemented as well.

In some example embodiments, user equipment, such as 114A-C, may be implemented as a mobile device and/or a stationary device. The user equipment may be referred to as, for example, a wireless device, a mobile station, a mobile unit, a subscriber station, a wireless terminal, a tablet, a smart phone, and/or the like. In some example embodiments, user equipment 114 may be implemented as multi-mode user devices configured to operate using a plurality of radio access technologies, although a single-mode device may be used as well. For example, user equipment may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. The user equipment may be located within the coverage area of a cell or multiple cells. The user equipment may also be configured to support point-to-point links to a base station and MBSFN (via for example a multicast or broadcast from one or more base stations).

The base stations, such as base stations 110A-C may, in some example embodiments, be configured as an evolved Node B (eNB) type base station, although other types of base stations and wireless access points may be used as well. In the case of eNB type base station, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base stations may also be configured to serve cells using a WLAN technology, such as WiFi (for example, the IEEE 802.11 series of standards), as well as any other radio access technology capable of serving a cell. The base stations may have wired and/or wireless backhaul links to other networks and/or network nodes including core network 190. Although some of the examples described herein refer to E-UTRAN, other types of networks, such as UTRAN (UMTS Terrestrial Radio Access Network), GERAN (GSM EDGE Radio Access network), WCDMA (Wideband Code Division Multiple Access), HSPA (High Speed Packet Access), and/or any other type of radio network. Moreover, the base stations may be configured to support MBMS and, as such, a MBSFN to one or more user equipment 114A-C.

Figure 2:
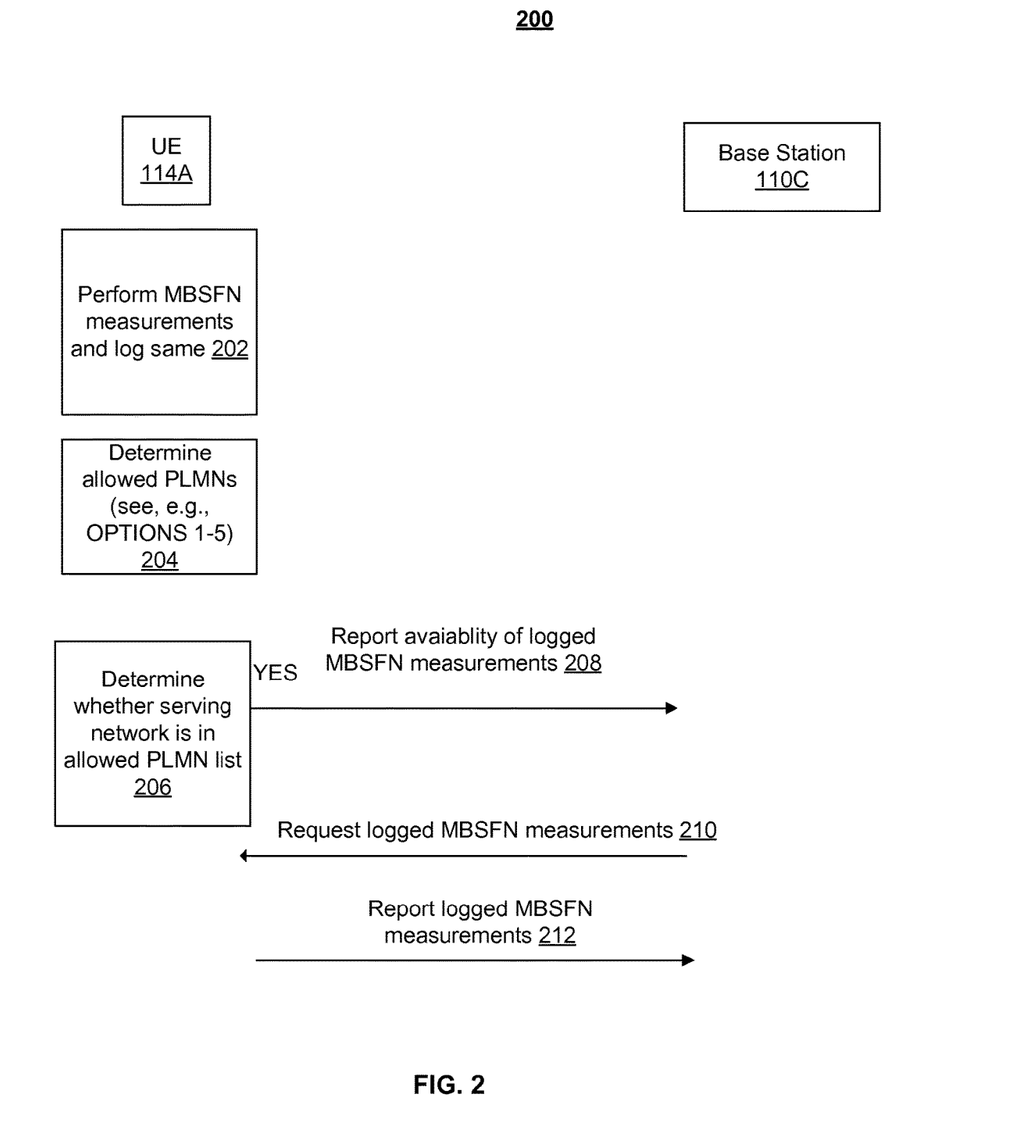
FIG. 2 depict an example of a process for determining one or more public land mobile networks allowed to receive an indication of logged multicast broadcast single-frequency network (MBSFN) measurement availability and/or a report including the logged multicast broadcast single-frequency network (MBSFN) measurements, in accordance with some exemplary embodiments.

FIG. 2 depicts an example process 200 for determining whether a PLMN is allowed to receive logged measurements, in accordance with some example embodiments. The description of process 200 also refers to FIG. 1.

At 202, user equipment 114A may perform one or more MBSFN measurements and log the same, in accordance with some example embodiments. For example, user equipment 114A may measure one or more MBSFN subframes and, in particular, measure the RS in one or more MBSFN subframes being decoded. These measurements may be used to determine RSSI, RSRQ, RSRP, block error rate (BLER) measurements, and/or any other measurements on the MBMS subframes. Moreover, the measurements may be logged at the user equipment 114A for subsequent reporting on request. For example, the user equipment 114A may make a measurement of an MBSFN transmitted by base station 110A and/or 110B and then log the measurement for subsequent reporting to the network. As noted, the measurement configuration of user equipment 114A may be defined by a standard and/or provided by the network. For example, the measurement configuration may be sent in response to an OAM and/or a MDT function, where a Trace function activates the MBSFN measurements and collects reported data.

At 204, user equipment 114A may determine allowed PLMNs, in accordance with some example embodiments. For example, the user equipment 114A may be configured by a standard and/or a network to determine allowed networks and/or PLMNs as described above with respect to one or more of configured rule 1-5. For example, the allowed PLMNs may include only the PLMN(s) listed in the PLMN identity list provided by the network; the PLMN registered the time of MBSFN MDT measurement configuration; and/or the PLMN(s) obtained from the TMGI(s).

At 206, user equipment 114A may determine whether the service network is on the allowed PLMN list, in accordance with some example embodiments. For example, user equipment 114A may determine whether base station 110A providing the MBMS service to user equipment 114A is an allowed PLMN as determined at 204. If so (yes at 206 and 208), user equipment 114A may, at 208, report to the network, such as base station 110A, the availability of logged MBSFN measurements, in accordance with some example embodiments. In response to message 208, the network, such as base station 110A, may request, at 210, user equipment 114A to report the logged MBSFN measurements, in accordance with some example embodiments. At 212, user equipment 114A may report, in response to request 210, the logged MBSFN to the network, in accordance with some example embodiments.

Figure 3:
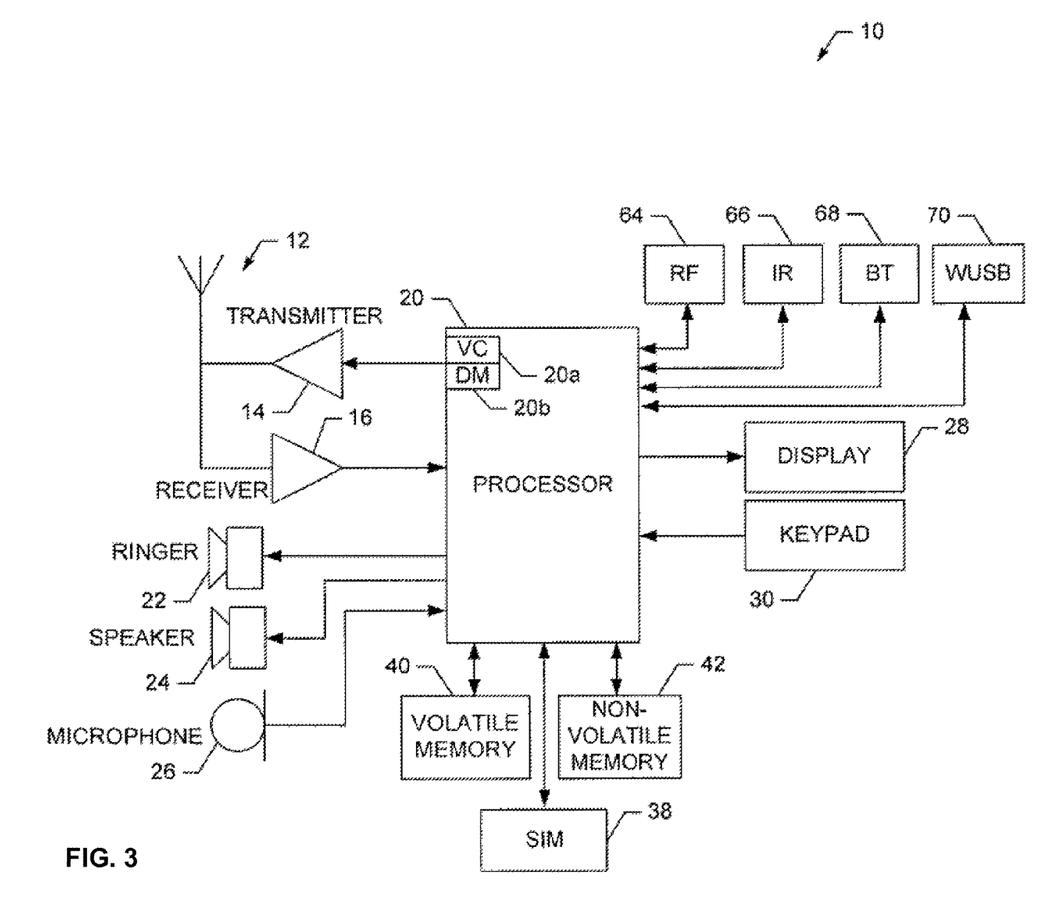
FIG. 3 depicts an example of a user equipment, in accordance with some exemplary embodiments.

FIG. 3 illustrates a block diagram of an apparatus 10, in accordance with some example embodiments. The apparatus 10 (or portions thereof) may be configured to provide a user equipment 114A-C, such as a smart phone, a communicator, a machine type communication device, a wireless device, a wearable device, a cellular phone, a wireless sensor/device and/or the like. Moreover, the user equipment may be configured to support MBMS and, as such, MBSFN.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed. The apparatus may also be configured to support point-to-point links to a base station and MBSFN (via for example a multicast or broadcast from one or more base stations).

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as process 200 and/or any other operations/functions disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to process 200 including for example logging, at a user equipment, one or more measurements performed on a first set of subframes associated with multicast broadcast mobile services; and determining, by the user equipment based on a configured rule, whether a serving network node is a public land mobile network to which the user equipment is allowed to indicate availability of the logged one or more measurements and/or report the logged one or more measurements.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4:
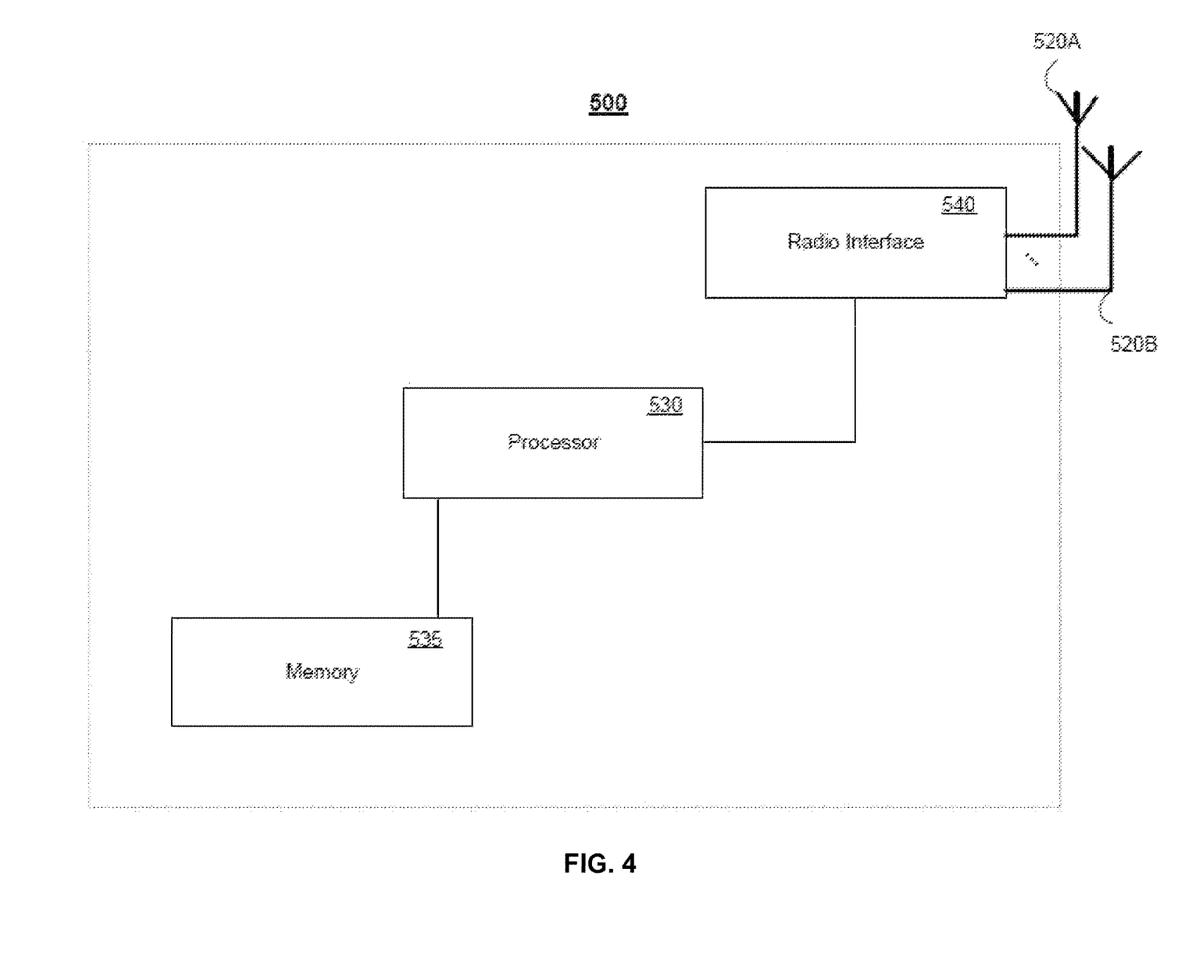
FIG. 4 depicts an example of a network node, such as a base station, in accordance with some exemplary embodiments.

FIG. 4 depicts an example implementation of a wireless access point 500, which may be implemented at for example base station 110A, B, and/or C in accordance with some example embodiments. Moreover, the base stations 110A-C may be configured to support MBMS and, as such, MBSFN.

The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to the network at process 200.

Without in any way limiting the scope, interpretation, or application of the claims appearing below, a technical effect of one or more of the example embodiments disclosed herein is stateful and thus unambiguous operation with respect to the user equipment MBSFN log reporting.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   logging, at a user equipment, one or more measurements performed on one or more subframes associated with multicast broadcast mobile services;
   receiving, by the user equipment and from a serving network node, a serving network identity; and
   determining, by the user equipment based on a configured rule, whether the serving network identity is included in an allowed network list, the allowed network list indicating whether the user equipment is allowed to indicate an availability of the logged one or more measurements and/or report the logged one or more measurements to the serving network node, wherein the allowed network list includes public land mobile networks included in one or more temporary mobile group identities.

2. The method of claim 1, wherein the allowed network list includes a public land mobile network identity list received as part of a measurement configuration of the user equipment.

3. The method of claim 1, wherein the allowed network list includes a public land mobile network identity list received as part of a measurement configuration of the user equipment, an identity of an attached public land mobile network obtained when the measurement configuration is received at the user equipment, and/or one or more public land mobile network identities included in one or more temporary mobile group identities received in a multicast broadcast single-frequency network coverage area, wherein the one or more temporary mobile group identities each include public land mobile network identity information.

4. The method of claim 1, wherein the allowed network list includes one or more network identities included in one or more temporary mobile group identities received in a multicast broadcast single-frequency network coverage area, wherein the one or more temporary mobile group identities each include public land mobile network identity information.

5. The method of claim 1, wherein the allowed network list includes a public land mobile network identity list received as part of a measurement configuration of the user equipment and/or one or more public land mobile network identities included in one or more temporary mobile group identities received in a multicast broadcast single-frequency network coverage area, wherein the one or more temporary mobile group identities each include public land mobile network identity information.

6. The method of claim 1, wherein the allowed network list only contains an identity of an attached public land mobile network obtained when a measurement configuration is received at the user equipment.

7. An apparatus, comprising:
   at least one processor; and
   at least one memory including computer program code, the at least one memory and the computer program code configured to, with the at least one processor, cause the apparatus at least to:
   log, at the apparatus, one or more measurements performed on one or more subframes associated with multicast broadcast mobile services;
   receive, at the apparatus and from a serving network node, a serving network identity; and
   determine, by the apparatus based on a configured rule, whether the serving network identity is included in an allowed network list, the allowed network list indicating whether the apparatus is allowed to indicate an availability of the logged one or more measurements and/or report the logged one or more measurements to the serving network node, wherein the allowed network list includes public land mobile networks included in one or more temporary mobile group identities.

8. The apparatus of claim 7, wherein the allowed network list includes a public land mobile network identity list received as part of a measurement configuration of the apparatus.

9. The apparatus of claim 7, wherein the allowed network list includes a public land mobile network identity list received as part of a measurement configuration of the apparatus, an identity of an attached public land mobile network obtained when a measurement configuration is received at the apparatus, and/or public land mobile network identities included in one or more temporary mobile group identities received in a multicast broadcast single-frequency network coverage area, wherein the one or more temporary mobile group identities each include public land mobile network identity information.

10. The apparatus of claim 9, wherein the allowed network list includes a combination of network identities listed on the public land mobile network identity list received as part of the measurement configuration of the apparatus, the public land mobile network identities include identities included in the temporary mobile group identities received in the multicast broadcast single-frequency network coverage area, and the identity of the attached public land mobile network obtained when the measurement configuration is received at the apparatus.

11. The apparatus of claim 9, wherein the allowed network list includes one or more network identities found in both the public land mobile network identity list received as part of the measurement configuration of the apparatus and the public land mobile network identities included in the temporary mobile group identities received in the multicast broadcast single-frequency network coverage area.

12. The apparatus of claim 9, wherein the allowed network list includes the public land mobile networks of the temporary mobile group identities received by the apparatus.

13. The apparatus of claim 7, wherein the allowed network list includes one or more network identities included in one or more temporary mobile group identities received in a multicast broadcast single-frequency network coverage area, wherein the one or more temporary mobile group identities each include public land mobile network identity information.

14. The apparatus of claim 7, wherein the allowed network list includes a public land mobile network identity list received as part of a measurement configuration of the apparatus and/or public land mobile network identities included in one or more temporary mobile group identities received in a multicast broadcast single-frequency network coverage area, wherein the one or more temporary mobile group identities each include public land mobile network identity information.

15. The apparatus of claim 14, wherein the allowed network list includes a combination of the networks listed on the public land mobile network identity list received as part of the measurement configuration of the apparatus and the public land mobile network networks identified in the temporary mobile group identities received in the multicast broadcast single-frequency network coverage area are used as the allowed public land mobile networks.

16. The apparatus of claim 14, wherein the allowed network list includes one or more network identities found in both the public land mobile network identity list received as part of the measurement configuration of the apparatus and the public land mobile network identities in the temporary mobile group identities received in the multicast broadcast single-frequency network coverage area.

17. The apparatus of claim 7, wherein the configured rule allows the indication and/or the report only to a public land mobile network to which the apparatus is attached when a measurement configuration is received at the apparatus.

18. A non-transitory computer readable storage medium including computer program code which when executed by at least one processor causes operations comprising:
    logging, at an apparatus, one or more measurements performed on one or more subframes associated with multicast broadcast mobile services;
    receiving, by the apparatus and from a serving network node, a serving network identity;
    and determining, by the apparatus based on a configured rule, whether the serving network identity is included in an allowed network list, the allowed network list indicating whether the apparatus is allowed to indicate availability of the logged one or more measurements and/or report the logged one or more measurements to the serving network node, wherein the allowed network list includes public land mobile networks included in one or more temporary mobile group identities.

* * * * *